June 2, 1964  M. I. HOFFMAN III  3,135,093
HYDRAULIC POWER TRANSMISSION
Filed Oct. 16, 1961  3 Sheets-Sheet 1
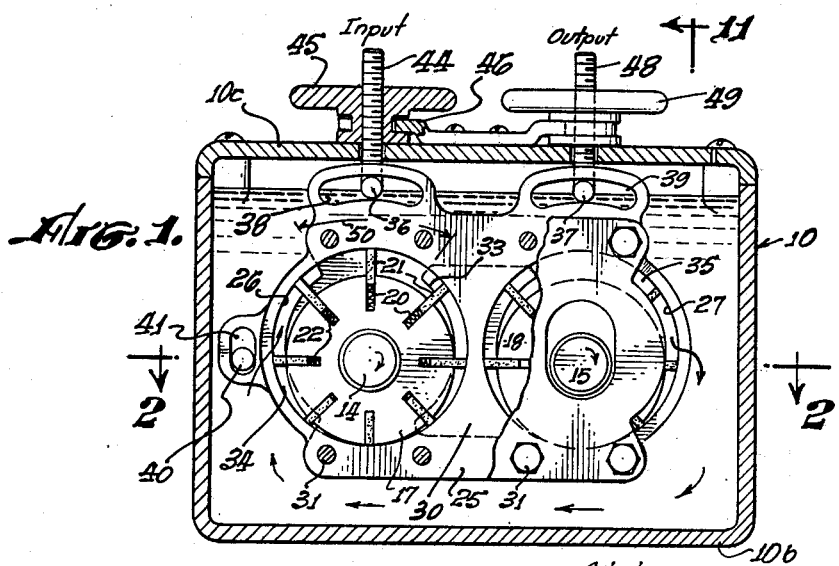
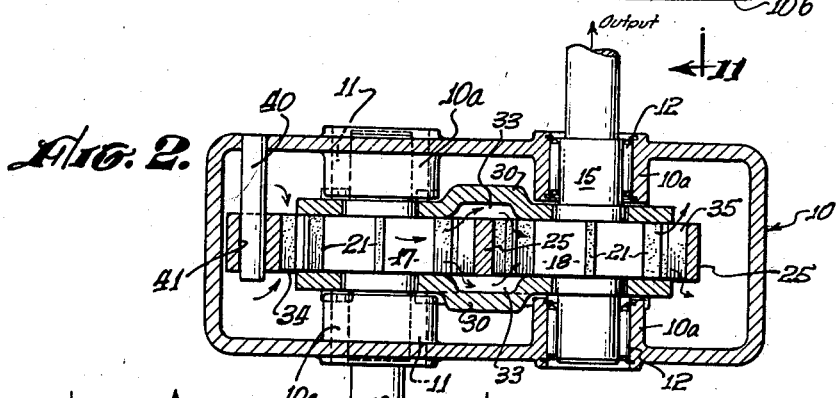
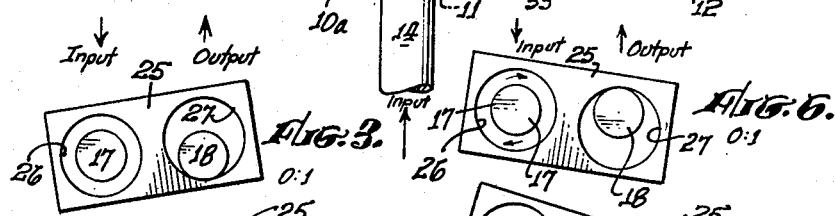
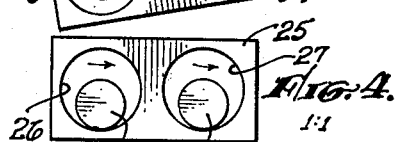
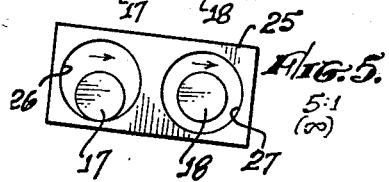
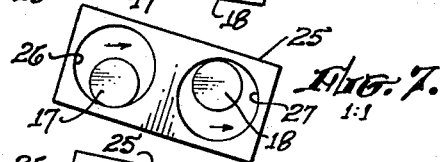
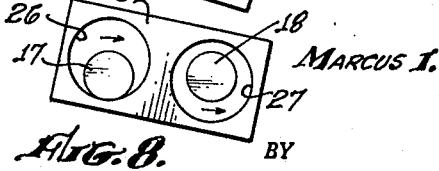
MARCUS I. HOFFMAN, III
INVENTOR.
BY Knight & Rodgers
ATTORNEYS.

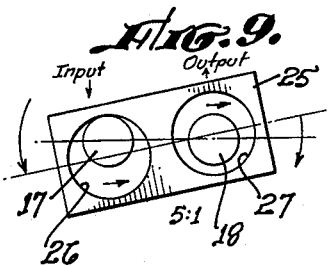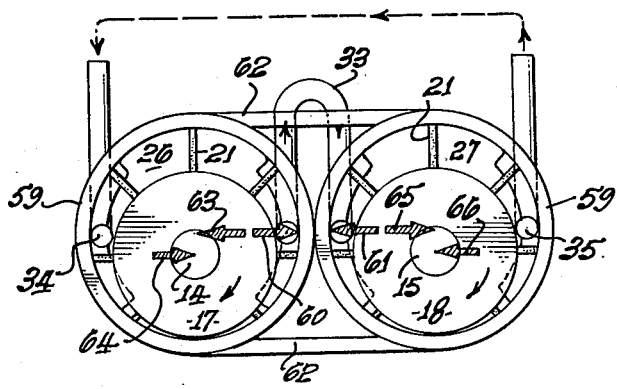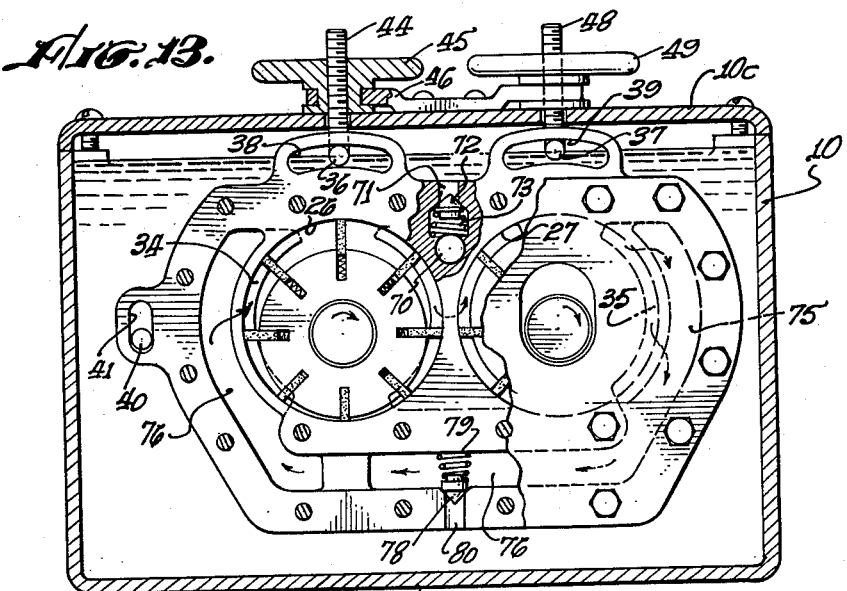

June 2, 1964
M. I. HOFFMAN III
3,135,093
HYDRAULIC POWER TRANSMISSION
Filed Oct. 16, 1961
3 Sheets-Sheet 3
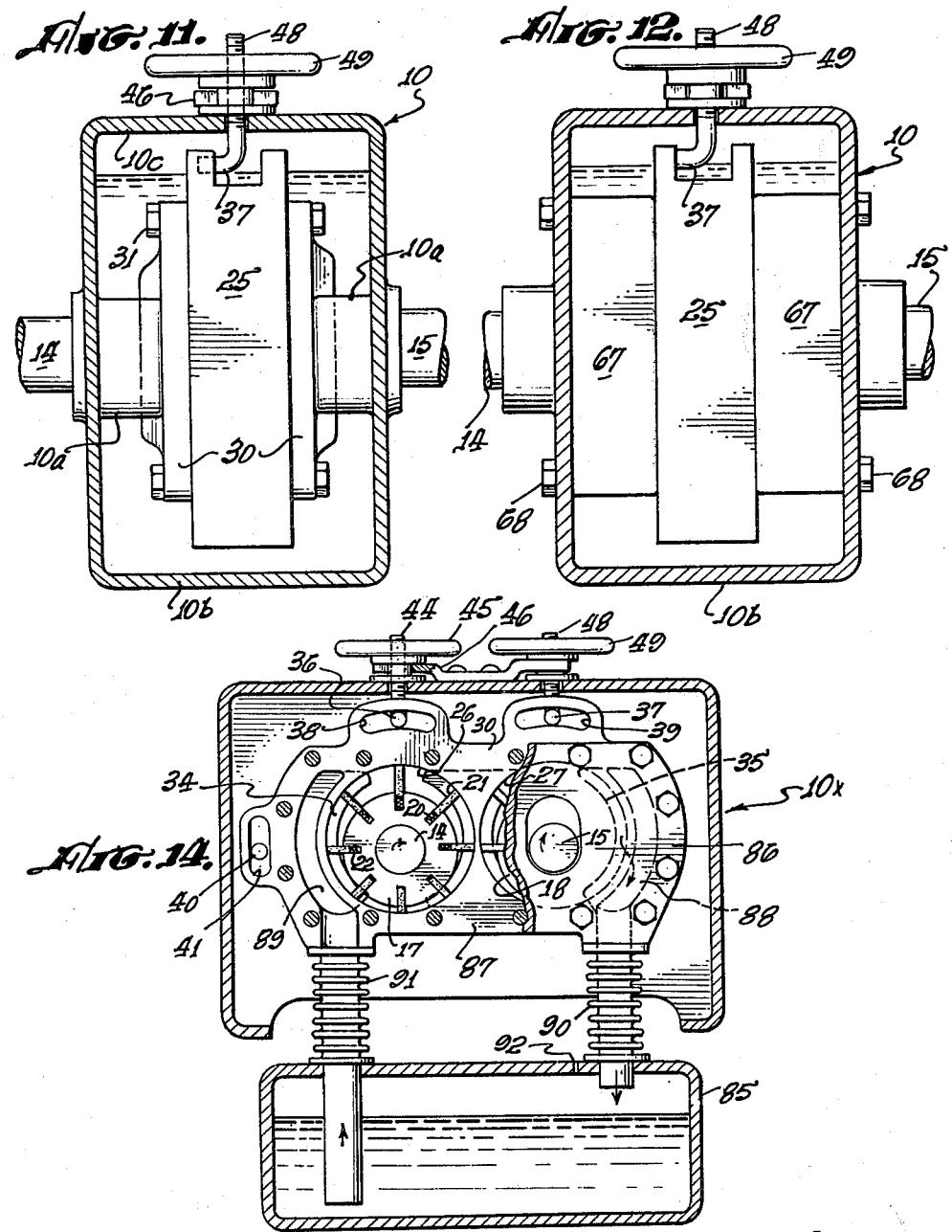
MARCUS I. HOFFMAN, III
INVENTOR.
BY Knight Rodgers
ATTORNEYS.

United States Patent Office 3,135,093
Patented June 2, 1964

3,135,093
HYDRAULIC POWER TRANSMISSION
Marcus I. Hoffman III, Woodland Hills, Calif.
(Rte. 1, Box N20, Del Mar, Calif.)
Filed Oct. 16, 1961, Ser. No. 145,161
6 Claims. (Cl. 60—53)

The present invention relates generally to variable speed devices for transmitting power; and more especially to continuously variable devices of the hydraulic type wherein a pressurized inelastic fluid is utilized to transmit power within the unit.

With increasing number and complexity of machines in our present day civilization, there has been an increasing demand for power transmitting devices because, for reasons which need not be detailed here, there have been increasingly numerous situations in which it is necessary to secure a change in the ratio of speeds between two rotating elements or a change in the torque or load transmitted through the unit. From the standpoint of function, the three main types of power transmissions have been mechanical, hydraulic, or electrical; but there have been various combination types in addition.

According to the use for which they are designed, transmissions may be classified as "custom" or general use. When designed for a specific purpose, that is to fulfill a specific set of operating conditions, the transmission may be considered as being a custom design. Often times the operating requirements are so restrictive that the transmission is limited to substantially a single purpose or class of uses. On the other hand there is considerable need for a general use or all-purpose transmission which is comparatively simple in construction yet will fit a wide variety of operating conditions and purposes. Because such a transmission can be made in relatively large numbers, its cost can be reduced and it therefore has a wide appeal not only to manufacturers but to potential users who are interested in obtaining an efficient transmission at a relatively low cost.

For general purpose transmissions, the hydraulic type has many advantages. These include reliability in operation, low maintenance cost, simplicity of operation, flexibility in use and a stepless change in speed ratios, among others. These characteristics make the hydraulic type transmission suitable for a general purpose transmission which is adapted to provide a continuously variable ratio between input and output speeds, in contrast with a step change in ratio. Generally speaking, such hydraulic transmissions comprise an input pump and an output motor between which power is transmitted by hydraulic fluid under pressure.

It may be said that the general object of the present invention is to produce a variable speed transmission which approaches as closely as possible to the ideal; and one which suffers the least from the compromises which inevitably enter into the design because of conflicting design requirements.

While the following characteristics are not necessarily exhaustive of those which the ideal transmission would possess, the characteristics sought in an ideal transmission may be generally summarized as including the ability to accept very high or very low levels of power transmission as well as a wide range of speed ratios between the input and the output while at all times operating with the maximum overall efficiency. In an all-purpose unit, the transmission should be very flexible in its performance and thus adapted to the widest possible variety of uses. For this reason, it should be reversible in the direction of rotation of the output shaft and also adapted in design to be reversible in the direction of power flow through the unit since under some circumstances the prime mover may be used as a brake when the transmission can accept a reverse direction of power flow. This is true for example in the case of an automobile transmission.

Flexibility in use is also achieved by a continuous change in the speed ratios as opposed to a step change. Under all conditions the power flow should be smooth, steady, and non-pulsing. Likewise the mechanism should shift smoothly from one ratio to another at any point within the full range of ratios; and it should be capable of shifting whether stopped or in operation under load. Other characteristics of an ideal transmission include adaptability of a remote control; ability to dissipate heat losses, which are low if the efficiency is high; and freedom from vibration. A transmission that is small in size, low in weight and also low in cost has obvious appeal to the prospective purchaser and also to the prospective manufacturer because a unit of this type can command a sufficiently large potential market to make it a truly production item. Of course the user is also interested in a long and useful life, low maintenance cost, and freedom from repair and maintenance problems.

While it is true that non-hydraulic transmissions possess many of the above characteristics to a degree, yet it is believed that none of the designs currently available satisfies a very large segment of the total power transmission requirements. Thus a technically sound transmission which can be manufactured at lower cost and is more flexible in its application would represent a closer approach to an ideal transmission and would therefore have a definite place in a well established and expanding industry.

The general object of the invention has been achieved by providing a variable speed hydraulic transmission comprising a frame, and a pair of shafts which are parallel to each other and are carried by the frame for rotation about their respective axes which are held fixed in space relative to each other; a rotor rigidly secured on each shaft to rotate with the associated shaft; a plurality of radially movable vanes slidably mounted in each motor; a unitary ring body that defines an integral pair of rings surrounding the two rotors and vanes, each ring having a chamber containing one of said rotors and the vanes therein; means defining two separate fluid passages extending between and in communication with both the chambers containing the rotors; means cooperating with the frame to restrain movement of the ring body in all directions; and means for shifting the ring body relative to one or both of said shafts in a direction transverse to the shaft axis to provide for a change in eccentricity of the ring body with respect to one or both of the shafts.

How the above objects and advantages of the invention, as well as others not specifically referred to herein, are attained will be more readily understood by reference to the following description and annexed drawing, in which:

FIG. 1 is a vertical longitudinal section through a transmission constructed according to a presently preferred form of the invention, a portion of one of the side plates carried by the ring body being broken away to show a rotor and the vanes carried thereby.

FIG. 2 is a horizontal section on line 2—2 of FIG. 1.

FIGS. 3, 4 and 5 are diagrams showing various positions of the ring body relative to the fixed shafts for developing various speed ratios between input and output shafts for forward drive.

FIGS. 6, 7 and 8 are diagrams similar to diagrams of FIGS. 3, 4 and 5 respectively but for the reverse direction of rotation of the output shaft.

FIG. 9 is a similar diagram showing one position of the ring body with respect to the two shafts for a speed ratio corresponding to FIG. 5 but for the reverse direction of rotation of the input shaft.

FIG. 10 is a diagram showing the fluid circuit and the load balance in the transmission.

FIG. 11 is a vertical section on line 11—11 of FIG. 1 showing the ring body in elevation.

FIG. 12 is a view similar to FIG. 11 of a variational form of the transmission.

FIG. 13 is a view similar to FIG. 1 of another variational form of the transmission.

FIG. 14 is a view similar to FIG. 1 of still another variational form of transmission.

Referring now to the drawing, and particularly to FIGS. 1 and 2, it will be seen that the transmission constituting the present invention comprises a housing indicated generally at 10. A primary purpose of this housing is to provide a structural frame work for supporting bearings at 11 and 12 (in bosses 10a) which in turn rotatively mount shafts 14 and 15 respectively in the housing. Thus housing 10 provides a rigid frame work which maintains the axes of the two shafts 14 and 15 parallel to each other and fixed in space with respect to each other and to the other elements of the transmission. For this purpose alone the housing may have any suitable design.

The housing is preferably provided with a bottom wall 10b which enables the housing to act as a reservoir that holds a quantity of hydraulic fluid, the particular function of which will be described later. Each of the two shafts 14 and 15 has securely affixed to it a rotor which turns with the shaft, the rotors being indicated respectively at 17 and 18. The rotors may be attached to the shaft in any suitable manner. As may be seen in FIG. 1, each of the rotors is generally circular in outline and is provided with a plurality of radially extending slots 20 in each of which is located a movable vane 21 which is adapted for movement in and out of the slot in a direction radial with respect to the axis of rotation. Vanes 21 may be spring biased toward an outward position in any suitable manner, such spring means being shown diagrammatically at 22.

Surrounding each of the rotors 17 and 18 is a ring. In this construction the two rings are formed integrally into a single ring body 25 which is provided with two chambers 26 and 27, each of which is preferably circular in outline. Each of these chambers contains one of the rotors, rotor 17 and its vanes being located in chamber 26 while rotor 18 and its vanes are located within chamber 27. The spring means 22 urging the radial vanes outwardly causes the outer ends of the blades to bear against the inner peripheral face of the associated chamber wall to effect a fluid tight seal with the wall in order to apply pressure to the fluid trapped forwardly of the leading face of each of the vanes during a portion of the rotation of the rotor.

Although either of the two shafts 14 and 15 may be selected as the input shaft and the other as the output shaft in the design illustrated, it will be assumed for purposes of description that shaft 14 is the power input shaft and that shaft 15 represents the power output. In order to transfer power from the pump unit represented by shaft 14 and its attached rotor 17 to the motor unit represented by output shaft 15 and its attached rotor 18, it is necesary to provide a suitable fluid passage for high pressure fluid communicating between chambers 26 and 27. While other suitable means may be provided to form such fluid passage, two such fluid passages are here formed in or by the two side plates 30 which in the preferred embodiment, are attached one to each side of ring body 25 by bolts 31 or other suitable means. As may be seen especially in FIG. 2, the side plates are recessed centrally between the two chambers 26 and 27 to provide at each side plate a passage 33 by which fluid may flow from chamber 26 to chamber 27. The recess in each side plate is slightly longer than the distance between the two chambers so that the recess overlaps a portion of each of the chambers at their adjoining peripheries, thus placing each fluid passage in communication at each end with the chambers. This is the passage for high pressure fluid which transfers energy from the driving rotor to the driven one.

A return path for low pressure fluid is also provided by a separate fluid passage means. Although other means may be provided for forming one or more such return passages, the return passage is here formed most conveniently by means including gaps between the side plates 30 and the periphery of the chambers 26 and 27, as indicated at 34 and 35. These gaps between the periphery of the chamber and the side plate at each of the two extreme opposite ends of the ring body provide ports 34 and 35 which in one case (ports 34) allows chamber 26 to communicate with the reservoir space within housing 10 to receive hydraulic fluid from the reservoir and in the other case (ports 35) allows chamber 27 to communicate with the reservoir space to discharge hydraulic fluid to the reservoir. Preferably both side plates 30 are shortened to provide such gaps making a total of four ports. The reservoir itself, formed in the bottom portion of the housing is the return path for fluid flow from the chamber 27 to chamber 26, inter-connecting the ports 34 and 35 at opposite ends of the ring body.

Another purpose of housing 10 is to provide a frame or base for properly locating the unitary ring body 25. For this purpose means are provided that cooperate with the frame or housing to restrain movement of the ring body in all directions. Elements of such restraining means are the pins 36 and 37 which are located in arcuate slots 38 and 39 respectively formed by upwardly projecting portions of the ring body. Pins 36 and 37 fit within their associated slots with small clearance in order to confine the ring body against upward or downward movement in a direction transverse to the axes of shafts 14 and 15.

Another of the restraining means is the pin 40 which as shown in FIG. 2, is rigidly secured to one wall of housing 10. Pin 40 rides within an elongated opening 41 located in a laterally extending projection at one end of the ring body. Here also the clearance between the pin and the sides of the opening is held to a minimum in order to prevent horizontal displacement of the ring body with respect to shafts 14 and 15. Restraint of the ring body against movement in a direction parallel to the axes of shafts 14 and 15 is accomplished by having the bosses 10a containing bearings 11 and 12 project inwardly from the side walls of the housing (see FIG. 11) sufficiently that they approach or engage the side faces of plates 30 to provide the desired degree of axial restraint on the ring body axially of the input and output shafts.

While the ring body has been described as being restrained in movement in all directions, yet it is desired that the ring body be shiftable in a controlled manner in a direction transverse to the axes of shafts 14 and 15, that is in a direction parallel to the plane of FIG. 1. This is accomplished by means including the two pins 36 and 37 which are mounted in such a manner as to provide for individual movement of the pins toward and away from the shaft axes. For example pin 36 is located on the lower end of lead screw 44 which passes through housing top wall 10c and threaded bore in hand wheel 45. The hand wheel is permitted to rotate freely about its own axis but not to move axially with respect to the housing by bracket 46 which engages an annular groove in the hand wheel. A similar lead screw 48 passing through housing top wall 10c and a threaded bore in hand wheel 49 carries at its lower end pin 37. By turning either hand wheel 45 or hand wheel 49 in the proper direction, a selected one of pins 36 and 37 may be made to move toward or away from either of shafts 14 and 15 for purposes which will be later described. Generally speaking, this movement of either or both of the selected pins 36 and 37 causes the ring body to shift with respect to one or both of the fixed shafts so as to change the eccentricity of one or both chambers 26 and 27 with respect to the associated rotor for reasons which will be more fully understood. Since any other arrangement which will move the ring body in the manner described may be used in place of the particular arrangement illustrated, the invention is not to be considered as limited to the specific details illustrated.

Having described the construction of a preferred embodiment of the hydraulic transmission, its operation will now be described briefly.

From inspection of FIG. 1, it will be seen that the rotor 14 and its associated chamber 26 constitute a simple pump of the rotary vane type. With the parts in the position shown, assuming clock-wise rotation of shaft 14 and rotor 17, the size of the compartment between each two successive vanes 22 increases as the vanes sweep past inlet port 26. This increase in size draws hydraulic fluid into the compartment through the inlet port. This fluid is then trapped between the vanes as the second or following vane passes the upper edge of the inlet port and enters the top seal area, the extent of which is indicated by the arc 50. As the same compartment between two successive vanes 21 is subsequently moved past the outlet port represented by the entrance to passage 33, the compartment is diminished in size and the liquid is forced into the passage 33 from the compartment.

The size or volume of the compartments can be varied by changing the eccentricity of the ring body with respect to the rotor. In the case of the left hand rotor 17, any compartment is bounded on two sides by the two parallel side plates 30 and at the two ends by two vanes 21. Thus the only variable is the radial dimension of the compartment; this can be altered at will by moving the ring body by means of pin 36, the rotor and shaft 14 remaining fixed in position. In the position shown in FIG. 1, the eccentricity of the rotor with respect to the chamber is at a maximum and therefore the fluid discharge effected by the pump is also a maximum.

The motor unit represented by rotor 18 on shaft 15 and the associated vanes 21 is a substantial duplicate in size of the pump unit just described. Consequently the rate of flow into the motor unit is the same as the rate of discharge from the pump establishing a speed of rotation of the two shafts 14 and 15. Thus with the parts in the position shown in FIG. 1, the discharge from the input unit 14, 17 drives the output unit 15, 18 at the same speed. In other words the speed ratio between the input and output shafts 14 and 15, when the eccentricity is at a maximum at both sides of the unit, is 1:1. The same 1:1 ratio is maintained as long as the eccentricity of the rotors with respect to their chambers is the same. This condition is shown diagrammatically in FIG. 4.

If now the left hand end of the ring body is moved downwardly by turning hand wheel 45 and lowering pin 36 until the axis of chamber 26 coincides with the axis of rotor 17, the eccentricity is zero and it will be understood that then any of the compartments between two successive vanes 21 remain the same size during a complete revolution of the rotor. Under these circumstances there is no discharge from the input pump unit. Consequently the output motor unit 18 receives no liquid and its rotational speed is zero. With the parts in this position, as indicated diagrammatically in FIG. 3, the ratio of output to input speeds is 0:1 or zero. This may be described as being a neutral position since the output speed is zero. At the same time, it represents one extreme of movement away from the 1:1 driving position indicated in FIG. 4.

If now the movement of the ring body away from the position of FIG. 4 is limited to lowering the right hand end of the ring body by turning hand wheel 49 and dropping pin 37 to bring the axis of chamber 27 toward (or approaching coincidence with) the axis of rotation of rotor 18, then the condition indicated diagrammatically in FIG. 5 is reached. As this movement occurs, there is an increase in the speed of rotation at output shaft 15 relative to the input shaft. This occurs because there is little increase in the volumetric capacity of any given compartment between two successive vanes 21 as it moves from the fluid receiving position opposite passage 33 to the discharge position opposite outlet port 35. Hence the discharge from one compartment of the input pump is sufficient to provide the increment in volume for several compartments on the output motor and as a result the output shaft 15 is driven at a higher speed than the input shaft 14. While in theory the output shaft could reach an infinite velocity, of course, in practice this high a ratio cannot be achieved. From a practical standpoint however a speed ratio of output to input of 5:1 or more can be achieved; but 5:1 is the here assumed maximum indicated in the drawing.

In the immediately foregoing discussion of the operation, both shafts 14 and 15 have been assumed to be rotating in a clockwise direction. Because of the symmetrical construction of the transmission, it is possible to drive the output shaft in the reverse direction with equal efficiency. Starting from the position of the parts shown in FIG. 4, this reverse drive at a 1:1 ratio is achieved by moving the parts into the position shown diagrammatically in FIG. 7 in which the axis of chamber 27 has been moved to a position below the axis of rotation of shaft 15. This is accomplished by moving pin 37 towards shaft 15 to the lower extreme of its range of movement. The ring body has now been "cocked" by dropping the right hand end and the direction of eccentricity of the chamber with respect to the rotor has been changed. This change causes the shaft to be rotated in the counter-clockwise direction but at a speed ratio of 1:1 since the amount of eccentricity of the input and output shafts remains the same.

Without changing the position of the right hand end of the ring body, if the left hand end is now lowered to bring the axis of chamber 26 into coincidence with the axis of input shaft 14, then the parts occupy the position shown diagrammatically in FIG. 6. As previously explained, in this position the discharge from the input pump unit is reduced to zero and consequently the output motor receives no fluid to drive it. As a result the output speed is zero and the ratio of input to output may be considered as being 0:1.

By bringing the parts into the relative position shown diagrammatically in FIG. 8, wherein the eccentricity of rotor 18 is less than the eccentricity of rotor 17, it will be understood that the output shaft can be driven at a higher speed than the input shaft, subject to the practical limitations previously mentioned.

It has been pointed out above that the output shaft may be driven either clockwise or counter-clockwise for a clockwise direction of the input shaft. It is likewise true that the input shaft may be driven either clockwise or counter-clockwise and produce thereby either clockwise or counter-clockwise rotation of the output shaft. This property of the transmission is possessed because of the symmetrical construction of the unit and it will be apparent how these results are obtained without any detailed description. FIG. 9 illustrates diagrammatically a position of the parts in which counter-clockwise direction of the input produces clockwise direction of the output shaft. The particular position selected is the high output ratio or 5:1 corresponding to FIGS. 5 and 8.

From the foregoing description it will be understood that the present transmission is designed to work on the principle of changing a force into a pressure in fluid held in a confined volume by imposing a force upon a movable area in contact with the fluid and transmitting the pressure by means of the fluid to another or different movable area where the pressure in the fluid is reconverted into another force that moves the second movable area. The first of these movable areas is provided by means 21 on the input rotor 17; while the second movable area is provided by means 21 on the output rotor 18. In each case the net useful movable area is the difference between the area on a vane that is being moved into the discharge side of the pump and a vane that is being moved out of the discharge side of the pump. Thus the net useful area is something less in each case than the total area of a vane projecting beyond the periphery of rotor 17.

By moving the rings surrounding a rotor with respect to the rotor the eccentricity of the chamber with respect to the rotor is changed and the net movable area that is useful can be varied from zero, when the eccentricity of the chamber axis is zero, to a maximum as the eccentricity of the chamber axis approaches a maximum. In this latter condition the ring and the rotor approach contact with each other.

Because the inlet pump unit is discharging into a restricted volume represented by passages 33 plus the volumetric capacity of the output motor unit, fluid pressure within the pump unit will rise. As a consequence a hydraulic load or force is exerted against the rotor, as indicated by the arrow 63 in FIG. 10. This figure is a diagram in which the rings are each indicated individually by two concentric circles at 59. Since the forces on a single ring are in equilibrium, there is exerted an equal and opposite hydraulic force against the ring indicated by arrow 60 constituting the reaction of the ring to this hydraulic load. For the same reason there is exerted a reaction 61 in the output pump unit to the hydraulic load 65 on the ring. If the two rings surrounding the rotors are connected together by ties 62, which has been done in the present invention by combining them into a single integral ring body, then the two forces 60 and 61 neutralize each other since they are equal and oppositely directed.

The hydraulic load on each rotor is equal and opposite that on the associated ring and may be represented by the arrow 63 in the case of the input unit 17. Mechanical reaction to this load is represented by the arrow 64 which is the reaction force exerted through shaft 14 by the support bearings 11. The comparable force at rotor 18 is reaction 66 exerted through shaft 15 and bearings 12. Forces 64 and 66 are transmitted to frame 10 and therein neutralize each other.

In order to make FIG. 10 a complete diagrammatic representation of the transmission unit, the passage 33 in the side plate is shown as connected between the two chambers 26 and 27, and more particularly between the outlet from chamber 26 and the inlet to chamber 27. This is a passage means for conducting fluid under pressure from the pump unit to the motor unit. The return path is provided by separate fluid passage means extending between the outlet port 35 of the motor unit to the inlet port 34 of the pump unit. This circuit is in practice, as explained above, provided preferably by the interior space within housing 10; but it will be understood that any other suitable passage forming means providing a low pressure return path for the fluid may be used.

Turning now to FIGS. 11 and 12, one possible modification in the design and arrangement of the parts will be explained. FIG. 11 illustrates the arrangement described above in which side plates 30 are bolted directly onto opposite sides of ring body 25. The side plates move with the ring body in a direction perpendicular to axes of shafts 14 and 15. The bosses containing bearings 11 and 12 (or other portions of the housing) restrain the ring body and the side plates against lateral movement parallel to the axes of shafts 14 and 15 by engagement with a suitable portion of the ring body assembly.

It is also possible to mount the side plates 30 directly upon the walls of housing 10, in which case the side plates are stationary. Such an arrangement is shown in FIG. 12 in which the two side plates 67 are attached (to or made integral with) housing 10 inside thereof by bolts 68 or other suitable means. In this arrangement the ring body 25 is movable relative to the side plates and between them. The side plates engage the opposite parallel faces of the ring body with sufficient tightness to reduce to an acceptably low value the leakage of high pressure fluid from between the ring body in the side plates, such engagement also serving to restrain the ring body against movement in the direction parallel to the axes of shafts 14 and 15.

FIG. 13 illustrates another possible modification of the transmission the purpose of which is to adapt the transmission to a reverse direction of power flow through the unit. Such a condition is created, for example, when an automobile is going down-hill and the engine is being used to hold the vehicle back on the down-grade. The rotation of all the parts within the transmission is thus in the same direction as it was when the engine was pulling the automobile up the hill, but the power now flows in the reverse direction. In order to accommodate the transmission described above to this situation, one additional element in the combination is required and that is means providing a closed return path for high pressure fluid over that portion of that circuit which was originally a low pressure path since now the energy is being introduced into the transmission through shaft 15 and rotor 18 which, in normal operation, is the output.

The transmission as illustrated in FIG. 13 is preferably the same as that previously described, except for the additional features which will now be set forth. A transverse passage 70 in the ring body communicates preferably at each end with a fluid passage 33 at the side of the ring body. From passage 70 passage 71 extends upwardly through the ring body and communicates at its outer end with the reservoir space within housing 10. This upwardly extending passage 71 has located in it check valve 72 which is biased by spring 73 toward an upward or closed position, viewed as in FIG. 13, in which the passage 71 is closed to fluid flow from passage 70 into the reservoir when the pressure within the passages 33 and 70 is higher than the fluid pressure within the reservoir. However, when for any reason fluid pressure within passages 33 and 70 drop below the fluid pressure within the reservoir surrounding the ring body, then valve 72 opens against the pressure of spring 73 and admits fluid into the interior passages of the ring body.

The side plates in this form of the invention have been modified by extending them beyond the ring body for about half the periphery. The two side plates 75 are each shaped alike and are recessed to define an internal passage 76 which communicates at one end with outlet ports 35 from the motor unit and at the other end with inlet port 34 of the pump unit. Passage 76 is thus completely closed or isolated from the reservoir space inside the housing and is adapted to conduct fluid at a high pressure through the passage to provide a complete circuit internally of the side plates and the ring body.

A second check valve 78 is biased by compression spring 79 in a direction to close passage 80 communicating between passage 76 and the reservoir space within the housing 10. Thus high pressure fluid assists in seating valve 78 to maintain such fluid within the passage. However, when for any reason pressure within passage 76 drops below the fluid pressure in the reservoir space within housing 10, the excess pressure externally of passage 76 causes valve 78 to open against the force of spring 79 and admit hydraulic fluid into passage 76.

In operation of any hydraulic pump or similar device it will be appreciated that there is normally some small leakage of hydraulic fluid from areas of high fluid pressure. In this case (FIG. 13) such leakage is into the reservoir space and it becomes necessary to replace this leakage by admitting hydraulic fluid from the reservoir space into the low pressure passages within the transmission. When the leakage reaches such a point that fluid pressure in either passage 76 or passage 70 drops below reservoir pressure (depending upon which one is the low pressure passage according to then existing operating conditions), one of the valves 78 or 72 opens to admit make-up fluid to restore the minimum pressure within the transmission unit to substantially that existing in the surrounding reservoir.

The particular size, shape, or arrangement of the internal passages 70, 71, 76 and 80 is not critical and may be changed at the choice of the designer so long as a closed high pressure return passage is provided with means to supply make-up hydraulic fluid from the reservoir.

One of the advantageous features of the preferred form first described is that the frame 10 has walls that define an internal reservoir, making a fully self-contained unit. However, it is entirely feasible to separate the reservoir from the housing or frame and such an arrangement is shown in FIG. 14. In the latter form the housing 10X is open at the bottom to allow communication with the reservoir 85. Otherwise the housing may be the same as described.

The ring body and side plate assembly is made as previously described except for one modification. The plates 86 and body 87 are extended at opposite ends beyond the limits of body 25 to provide the two cavities 88 and 89 one at each of opposite ends. These cavities respectively communicate with the discharge ports 35 of the motor unit and with the inlet ports 34 of the pump unit. In this respect the forms of FIG. 14 and FIG. 13 are alike. A conduit 90, preferably flexible, is connected to the body assembly to communicate with cavity 88 and the interior of reservoir 85. A second similar conduit 91 communicates between cavity 89 and the interior of reservoir 85. The latter is the supply or intake line and the former is the return or drain line. The reservoir should be vented to atmosphere at 92 or else lightly pressurized to insure adequate circulation through the reservoir and fluid supply to the pump unit. Operation of the form of FIG. 14 is the same as already described.

In the foregoing description it will be seen that various changes in the shape and arrangement of parts and their relation to each other may be made without departing from the spirit and scope of the invention and that such changes may occur to persons of ordinary skill in the art. Accordingly it is to be understood that the foregoing description is considered as being illustrative of, and not limitative upon, the invention defined by the appended claims.

I claim:

1. A variable speed hydraulic transmission comprising:
a frame;
two spaced shafts;
means carried by the frame mounting the shafts for rotation about their respective axes which are parallel and fixed in position relative to each other;
a rotor rigidly secured on each shaft and rotating with the associated shaft;
a plurality of radially movable vanes slidably mounted in each rotor;
a unitary ring body comprising an integral pair of rings, each ring defining a chamber containing one of said rotors;
means closing the chambers at the sides of the ring body;
means defining two separate fluid passages extending between and in communication with both said chambers;
means cooperating with the frame to restrain movement of the ring body in all directions;
and means for shifting the ring body relative to a selected one of the two shafts in a plane perpendicular to the axes of both shafts by pivotal movement substantially about the axis of the other shaft, whereby eccentricity of the ring body may be changed relative to either rotor without change of eccentricity relative to the other rotor.

2. A variable speed transmission as claimed in claim 1 in which the means for shifting the ring body includes means to provide also for movement of translation of the ring body in a direction substantially perpendicular to a plane containing the two axes.

3. A variable speed transmission as claimed in claim 2 in which the last mentioned means includes a linear slot in the body extending substantially perpendicular to said plane containing the two axes and a fixed pin on the body received in said slot.

4. A variable speed transmission as claimed in claim 1 in which the ring body has a pair of spaced, elongated slots, and the means for shifting the ring body includes: a pair of individually movable members mounted on the housing and each engaging the ring body in one of said slots; means for individually shifting said members respectively toward and away from one of the axes to effect corresponding shifting of the ring; and anchor means holding the ring body substantially against linear movement in a direction parallel to the plane passing through both axes.

5. A variable speed hydraulic transmission comprising:
a housing providing a reservoir holding a quantity of hydraulic fluid;
two spaced shafts extending into the housing;
means carried by the housing mounting the shafts for rotation about their respective axes which are parallel and fixed in position relative each other;
a rotor secured on each shaft within the housing and rotating with the associated shaft;
a plurality of radially movable vanes slidably mounted in each rotor;
a unitary ring body inside the housing comprising an integral pair of rings, each ring defining a chamber containing one of said rotors, said ring body also having an internal fluid passage to conduct fluid from one chamber to the other chamber and other internal passages admitting fluid to said one chamber from the reservoir and discharging fluid from the other chamber to the reservoir, the reservoir providing the return path for the fluid flow;
means carried by and movable with the ring body closing the chambers at the sides of the rotors;
and means restraining movement of the ring body in all directions including means for shifting the ring body relative to a selected one of the two shafts in a plane perpendicular to the axes of both shafts by pivotal movement substantially about the axis of the other shaft, whereby eccentricity of the ring body may be changed relative to either rotor without change of eccentricity relative to the other rotor.

6. A variable speed transmission as claimed in claim 5 in which the means for shifting the ring body includes means to provide for movement of translation of the ring body in a direction substantially perpendicular to a plane containing the two axes.

References Cited in the file of this patent

UNITED STATES PATENTS

| 2,145,872 | Glenn | Feb. 7, 1939 |
| 2,485,240 | Jackson | Oct. 18, 1949 |

FOREIGN PATENTS

| 450,253 | Germany | Oct. 4, 1927 |
| 234,680 | Great Britain | May 27, 1925 |